(12) United States Patent
Zhang

(10) Patent No.: US 11,805,362 B2
(45) Date of Patent: Oct. 31, 2023

(54) TERMINAL, CONTROL METHOD AND EQUIPMENT

(71) Applicant: BEIJING XIAOMI MOBILE SOFTWARE CO., LTD., Beijing (CN)

(72) Inventor: Yunfei Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 75 days.

(21) Appl. No.: 17/520,465

(22) Filed: Nov. 5, 2021

(65) Prior Publication Data

US 2022/0312117 A1 Sep. 29, 2022

(30) Foreign Application Priority Data

Mar. 26, 2021 (CN) .......................... 202110325446.1

(51) Int. Cl.
*H04R 5/02* (2006.01)
*G06F 1/16* (2006.01)
*H04N 23/57* (2023.01)
*H04N 23/90* (2023.01)

(52) U.S. Cl.
CPC ............. *H04R 5/02* (2013.01); *G06F 1/1641* (2013.01); *G06F 1/1686* (2013.01); *H04N 23/57* (2023.01); *H04N 23/90* (2023.01); *H04R 2499/15* (2013.01)

(58) Field of Classification Search
CPC ...... H04R 5/02; H04R 2499/15; H04N 23/57; H04N 23/90; G06F 1/1641; G06F 1/1686
See application file for complete search history.

(56) References Cited

U.S. PATENT DOCUMENTS

2019/0098121 A1 3/2019 Jeon et al.
2020/0329132 A1 10/2020 Jung et al.

FOREIGN PATENT DOCUMENTS

CN 209419660 U * 9/2019
WO 2020231202 A1 11/2020

OTHER PUBLICATIONS

Machine translation of CN 209419660 U; Cheng Sep. 2019 (Year: 2019).*
Machine translation of WO 2020/231202 Samsung Nov. 19, 2020 (Year: 2020).*
Extended European Search Report Issued in Application No. 21205382.1 dated Apr. 19, 2022, (9p).

* cited by examiner

*Primary Examiner* — Andrew L Sniezek
(74) *Attorney, Agent, or Firm* — Arch & Lake LLP

(57) ABSTRACT

A terminal includes a first middle frame, a second middle frame, a rotating assembly, a first screen, a first audio assembly, a second audio assembly, a third audio assembly and a fourth audio assembly. The rotating assembly is located between the first middle frame and the second middle frame and is connected with the first middle frame and the second middle frame respectively; the back surface of the first screen covers the first middle frame, the second middle frame and the rotating assembly; the first screen is a folding screen; the first audio assembly and the second audio assembly are located at two opposite ends of the first middle frame respectively; and the third audio assembly and the fourth audio assembly are mounted at two opposite ends of the second middle frame.

18 Claims, 7 Drawing Sheets

TERMINAL, CONTROL METHOD AND EQUIPMENT

CROSS REFERENCE TO RELATED APPLICATION

The present application is based on and claims priority to Chinese patent application No. 202110325446.1, filed on Mar. 26, 2021, the entire disclosure of which is incorporated herein by reference for all purposes.

TECHNICAL FIELD

The present disclosure relates to the field of electronic equipment, and particularly relates to a terminal and a control method and equipment.

BACKGROUND

With the continuous progress of science and technology, functions of mobile terminal equipment are more and more, the application scenes are more and more abundant, and the requirements on the mobile terminal are higher and higher. Audio is used as a performance index of the mobile terminal equipment, and user perception is more and more obvious. Due to limitation of the space in a terminal, an existing terminal is provided with as few loudspeakers as possible to save the structure space. For example, only one loudspeaker is installed in one terminal, the terminal can only achieve single-track amplification, then the audio effect is poor, and the user experience is affected.

SUMMARY

The present disclosure provides a terminal and a control method and equipment.

According to a first aspect of the present disclosure, provided is a terminal, including: a first middle frame; a second middle frame; a rotating assembly, located between the first middle frame and the second middle frame, and connected with the first middle frame and the second middle frame; a first screen, including a back surface covering the first middle frame, the second middle frame and the rotating assembly, where the first screen is a folding screen; a first audio assembly, arranged on the top of the first middle frame, and connected to the top end of the first middle frame through a sound output channel to output sound; a second audio assembly, arranged on the bottom of the first middle frame, and connected to the bottom end of the first middle frame through a sound output channel to output sound; a third audio assembly, arranged on the top of the second middle frame, and connected to the top end of the second middle frame through a sound output channel to output sound; and a fourth audio assembly, arranged on the bottom of the second middle frame, and connected to the bottom end of the second middle frame through a sound output channel to output sound.

According to a second aspect of the present disclosure, provided is a control method, applied to the above terminal, comprising: determining the posture of the terminal as disclosed in the first aspect of the present disclosure; determining a screen in the terminal that is in a display state, in the terminal; and according to the posture of the terminal and the distribution positions of the first audio assembly, the second audio assembly, the third audio assembly and the fourth audio assembly in the terminal relative to the screen in the display state, determining output parameters of output audio signals.

According to a third aspect of the present disclosure, provided is an equipment, comprising a processor, a memory and an executable program stored on the memory and capable of being run via the processor, wherein when the processor runs the executable program, the steps of the above control method as described in the second aspect of the present disclosure.

It should be understood that both the foregoing general description and the following detailed description are exemplary and explanatory only and are not restrictive of the present disclosure.

BRIEF DESCRIPTION OF THE DRAWINGS

The accompanying drawings here, which are incorporated in and constitute a part of the specification, illustrate examples consistent with the present disclosure and, together with the specification, serve to explain the principles of the present disclosure.

DETAILED DESCRIPTION

Figure 1:
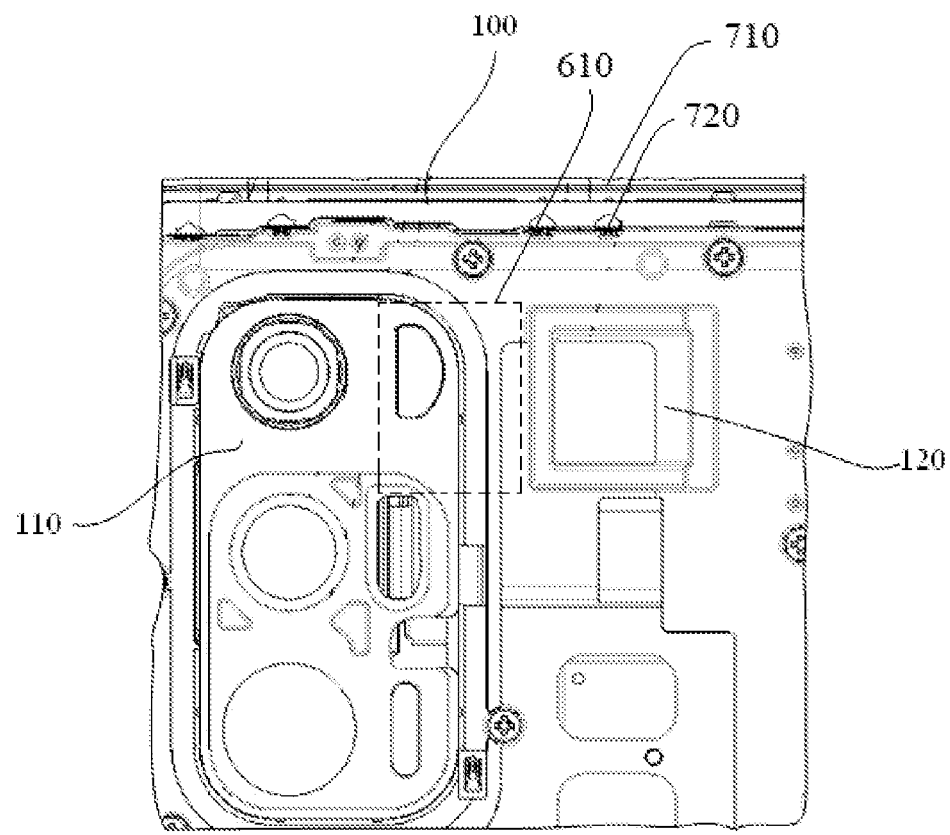
FIG. 1 is a first schematic diagram of a partial structure of a terminal according to one or more examples of the present disclosure.

Reference will now be made in detail to the exemplary embodiments, examples of which are illustrated in the accompanying drawings. When the following description refers to the accompanying drawings, the same numbers in different drawings represent the same or similar elements unless otherwise indicated. The implementations described in the exemplary embodiments below do not represent all implementations consistent with the present disclosure. Rather, they are merely examples of devices consistent with certain aspects of the present disclosure, as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 9:
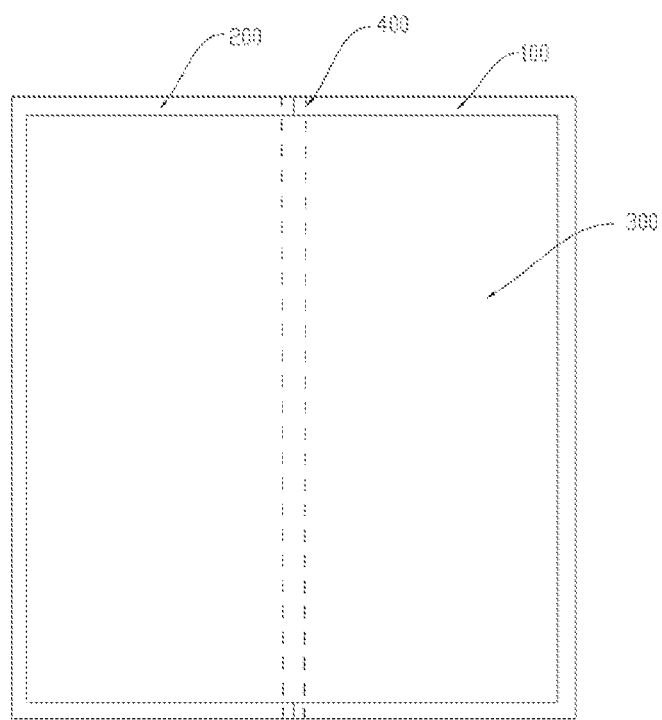
FIG. 9 is a front view of the terminal according to one or more examples of the present disclosure.

FIG. 1 is a schematic diagram of a partial structure, including a first middle frame 100, in a terminal according to an example, FIG. 9 is a front view of the terminal according to one or more examples of the present disclosure. As shown in FIG. 1 and FIG. 9, an example of the present disclosure provides a terminal, including:

a first middle frame 100;

a second middle frame 200;

a rotating assembly 400, located between the first middle frame 100 and the second middle frame 200, and connected with the first middle frame 100 and the second middle frame 200 respectively;

a first screen 300, with the back face covering the first middle frame 100, the second middle frame 200 and the rotating assembly; wherein the first screen 300 is a folding screen;

a first audio assembly 120, arranged on the top of the first middle frame 100, and connected to the top end 191 of the first middle frame 100 through a sound output channel 141 to output sound;

a second audio assembly 130, arranged on the bottom 192 of the first middle frame 100, and connected to the bottom end 192 of the first middle frame 100 through a sound output channel 141 to output sound;

a third audio assembly 210, arranged on the top of the second middle frame 200, and connected to the top end 270 of the second middle frame 200 through a sound output channel 141 to output sound; and a fourth audio assembly 220, arranged on the bottom of the second middle frame 200, and connected to the bottom end 280 of the second middle frame 200 through a sound output channel 141 to output sound.

As shown in FIG. 1 to FIG. 6, the first audio assembly 120 and the second audio assembly 130 are respectively located at two opposite ends of the first middle frame 100; wherein the first audio assembly 120 and the second audio assembly 130 are both located on the surface, facing away from the first screen 300, of the first middle frame 100; the third audio assembly 210 and the fourth audio assembly 220 are respectively mounted at two opposite ends of the second middle frame 200; wherein the third audio assembly 210 and the fourth audio assembly 220 are both located on the surface, facing away from the first screen 300, of the second middle frame 200.

Figure 2:
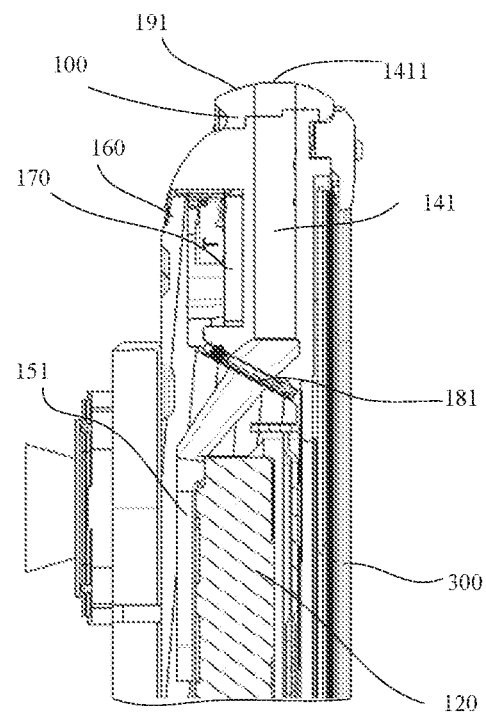
FIG. 2 is a second schematic diagram of the partial structure of the terminal according to one or more examples of the present disclosure.
Figure 3:
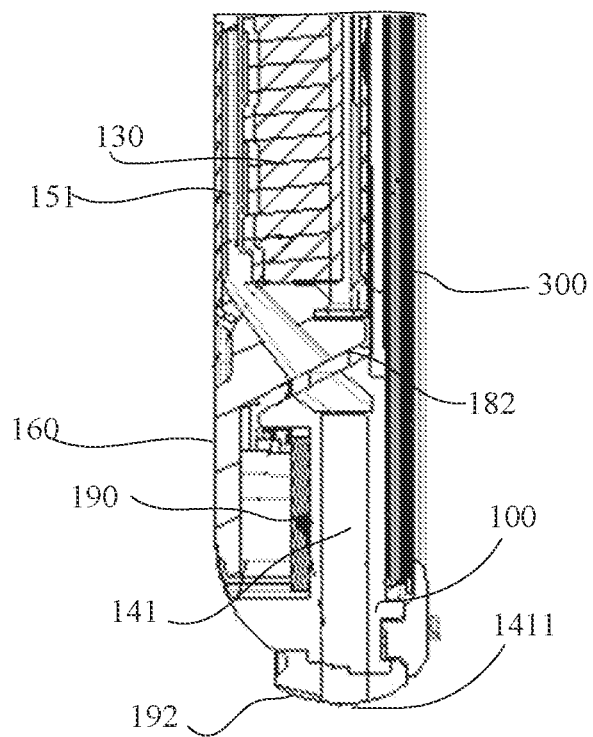
FIG. 3 is a third schematic diagram of the partial structure of the terminal according to one or more examples of the present disclosure.
Figure 4:
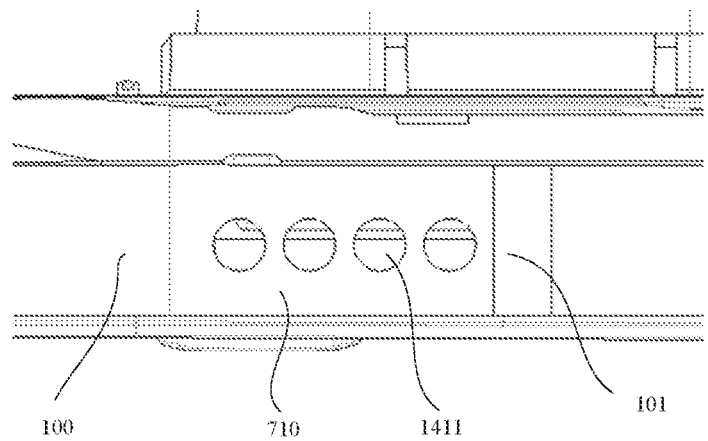
FIG. 4 is a fourth schematic diagram of the partial structure of the terminal according to one or more examples of the present disclosure.
Figure 5:
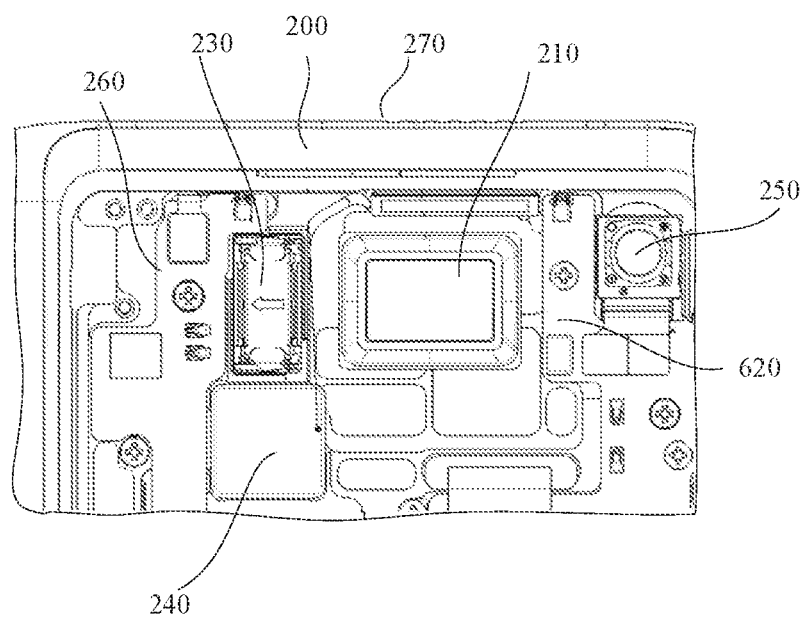
FIG. 5 is a fifth schematic diagram of the partial structure of the terminal according to one or more examples of the present disclosure.
Figure 6:
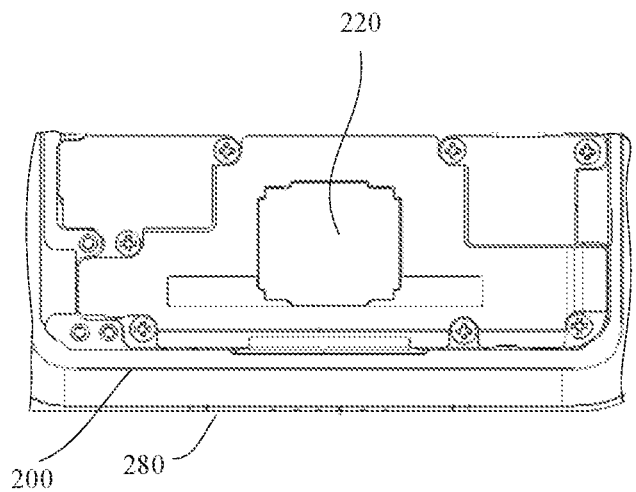
FIG. 6 is a sixth schematic diagram of the partial structure of the terminal according to one or more examples of the present disclosure.

In the example of the present disclosure, the terminal refers to a folding terminal, the first middle frame 100 and the second middle frame 200 can rotate mutually through the rotating assembly 400, and drive the first screen to have a folding posture and an unfolding posture at least. FIG. 1 to FIG. 4 show a schematic diagram of a partial structure of the terminal with the first middle frame 100, wherein FIG. 1 and FIG. 2 show a schematic diagram of a partial structure of the top end of the terminal, and FIG. 3 and FIG. 4 show a schematic diagram of a partial structure of the bottom end of the terminal. FIG. 5 and FIG. 6 show a schematic diagram of a partial structure of the terminal with the second middle frame 200; wherein FIG. 5 shows a schematic diagram of the partial structure of the top end of the terminal, and FIG. 6 shows a schematic diagram of the partial structure of the bottom end of the terminal.

In some examples, the first screen is a flexible screen, when in the folding posture, the first screen may be hidden between the first middle frame and the second middle frame. When in the unfolding posture, the first screen is completely exposed outside, and is parallel to the first middle frame and the second middle frame respectively, and at the moment, a user can experience a large-screen display effect of the terminal.

Without limitation, the rotating assembly 400 may include structures such as a rotating shaft, a hinge or a gear connecting the first middle frame with the second middle frame. For example, the rotating assembly includes: one rotating shaft or a plurality of rotating shafts which are linked and arranged in parallel.

The terminal includes a plurality of sound output channels 141. For example, the terminal includes four sound output channels 141, and each audio assembly communicates with one of the sound output channels 141.

In some examples, the first middle frame 100 and/or the second middle frame 200 is provided with a sound output channel 141, and a penetrating channel which communicates a sound cavity 151 with an external environment may be formed in the first middle frame 100 and/or the second middle frame 200 to form a sound output channel 141.

Without limitation, when the sound output channels 141 are arranged on the first middle frame 100 and/or the second middle frame 200, the sound output channels 141 corresponding to the first audio assembly 120 and the second audio assembly 130 penetrate through the first middle frame 100 in the direction of the plane of the first middle frame 100; the sound output channels 141 corresponding to the third audio assembly 210 and the fourth audio assembly 220 penetrate through the second middle frame 200 in the direction of the plane of the second middle frame 200; wherein the direction of the plane of the first middle frame 100 and the direction of the plane of the second middle frame 200 are roughly parallel to the first screen 300.

In some examples, the sound output channels 141 corresponding to the first audio assembly 120 and the second audio assembly 130 may further be formed by the first middle frame 100 and the first screen 300 jointly, and the sound output channels 141 corresponding to the third audio assembly 210 and the fourth audio assembly 220 may further be formed by the second middle frame 200 and the first screen 300 jointly. Namely, the first middle frame 100 and the first screen 300 jointly form the sound output channels 141, and/or the second middle frame 200 and the first screen 300 jointly form the sound output channels 141. By the structure of the sound output channels 141, the space of the first middle frame 100 is saved. Furthermore, the size of a sound output hole 1411 is reduced, and the screen-to-body ratio of the terminal is increased.

In some examples, the terminal further includes a first rear shell 160 and a second rear shell. The first rear shell 160 is mounted on the surface, facing away from the first screen 300, of the first middle frame 100; the second rear shell is mounted on the surface, facing away from the first screen 300, of the second middle frame 200; and generally, the first audio assembly 120 and the second audio assembly 130 are located between the first middle frame 100 and the first rear shell 160, and the third audio assembly 210 and the fourth audio assembly 220 are located between the second middle frame 200 and the second rear shell.

In some examples, the first middle frame 100 and the first rear shell 160 jointly form the sound output channels 141; and/or the second middle frame 100 and the second rear shell 160 jointly form the sound output channels 141.

Figure 10:
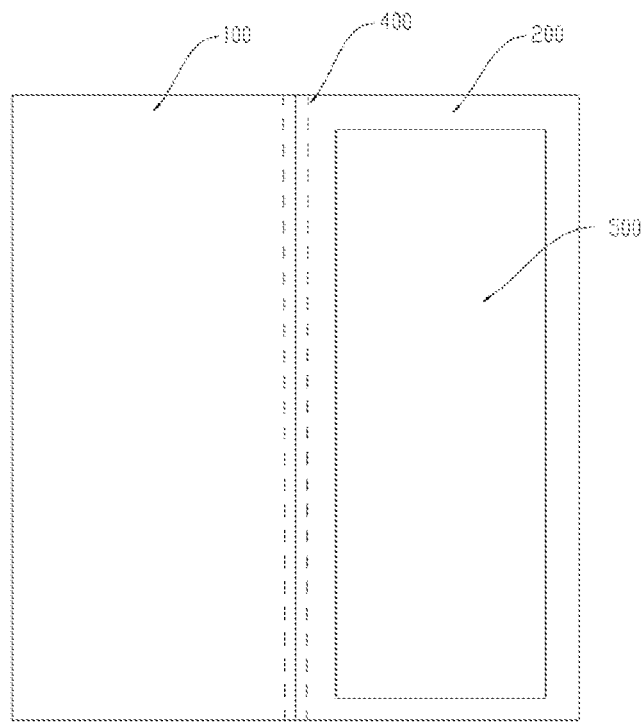
FIG. 10 is a rear view of the terminal according to one or more examples of the present disclosure.

FIG. 10 is a rear view of the terminal according to one or more examples of the present disclosure, as shown in FIG. 10, in some examples, the terminal further includes a second screen 500, and the second screen 500 is mounted on the surface, facing away from the first screen 300, of the second middle frame 200. Namely, the surface, facing away from the first screen 300, of the second middle frame 200 is not provided with the second rear shell, but is provided with the second screen 500. At the moment, the second middle frame 200 and the second screen may jointly form the sound output channels 141.

Generally, an audio assembly includes a loudspeaker.

In practical application, in order to present stereo sound, the terminal needs to be capable of playing left channel audio signals and right channel audio signals at the same time, and the multiple audio assemblies may form multiple combinations to play the left channel audio signals and the right channel audio signals respectively.

In some examples, when the first screen is in a display state, the orientation of a display area in a display state is defaulted to be the direction of a user, since the direction in which the display area faces a user is opposite to the direction in which the user faces the display area, a target audio assembly located on the left side of the center line of the display area of the first screen outputs right channel audio signals; a target audio assembly located on the right side of the center line of the display area of the first screen outputs left channel audio signals; wherein the target audio assembly includes at least one of the first audio assembly, the second audio assembly, the third audio assembly and the fourth audio assembly. For example, when the first screen is in a display state, the display area is an area capable of being displayed on the front face of the whole first screen, and when the display area is displayed in a vertical screen mode, a straight line where the rotating assembly is located may serve as the center line of the display area, and the third audio assembly and the fourth audio assembly located on the left side of the rotating assembly, namely the third audio assembly and the fourth audio assembly opposite to the right side of the user, output right channel audio signals. The first audio assembly and the second audio assembly located on the right side of the rotating assembly, namely the first audio assembly and the second audio assembly opposite to the left side of the user, output left channel audio signals. For another example, when the whole first screen is in a display state and the display area is displayed in a transverse screen mode, the straight line perpendicular to the straight line where the rotating assembly is located may serve as the center line of the display area, and the third audio assembly and the first audio assembly located on the left side of the center line output right channel audio signals. The fourth audio assembly and the second audio assembly on the right side of the center line output left channel audio signals.

In the example of the present disclosure, the first audio assembly and the second audio assembly are respectively distributed at the two opposite ends of the first middle frame, the third audio assembly and the fourth audio assembly are respectively distributed at the two opposite ends of the second middle frame, and the audio assemblies positioned at the two opposite ends can form sound surrounding and generate stereo sound, so that the audio output effect is improved. In practical application, the target audio assembly for outputting audio signals may be selected from the multiple audio assemblies by utilizing the multiple audio assemblies according to the posture of the terminal, and a target audio assembly may also be determined from the multiple audio assemblies to output left channel audio signals and/or right channel audio signals, so that the purpose of flexibly determining output parameters of output audio signals is achieved; and application scenes are enriched, and audio output quality and user auditory experience are further improved.

Figure 11:
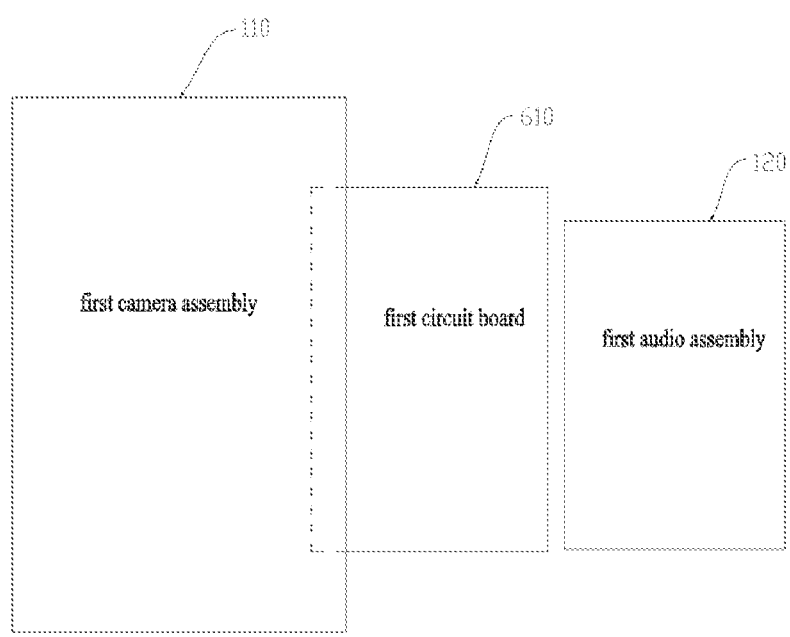
FIG. 11 is a schematic diagram of the partial structure of the terminal according to one or more examples of the present disclosure.

FIG. 11 is a schematic diagram of the partial structure of the terminal according to one or more examples of the present disclosure, as shown in FIG. 11, in another optional example, the terminal further includes:
  a first camera assembly 110, arranged on the first middle frame 100; and
  a first circuit board 610, wherein at least part of the first circuit board is arranged between the first audio assembly 120 and the first camera assembly 110.

As shown in FIG. 1 and FIG. 2, the first camera assembly 110 may be mounted on the surface, facing away from the first screen 300, of the first middle frame 100, and located between the first rear shell 160 and the first middle frame 100.

Without limitation, the first camera assembly 110 is a rear camera, at the moment, the first rear shell 160 is provided with a lens hole allowing the first camera assembly 110 to penetrate through. It will be appreciated that the first camera assembly 110 may also be a front camera.

Part of the first circuit board 610 located between the first camera assembly 110 and the first audio assembly 120 may be configured to bear a radio-frequency circuit and a feed spring plate, wherein the radio-frequency circuit is connected with a frame antenna of the terminal through the feed spring plate, and feeds signals into the frame antenna.

In another optional example, the terminal further includes:
- a second circuit board 170 (e.g., a circuit board 170), arranged between the top end of the first middle frame 100 and the first audio assembly 120; and/or
- a third circuit board 190 (e.g., an auxiliary circuit board 190), arranged between the bottom end of the first middle frame 100 and the second audio assembly 130.

For example, the terminal can include a circuit board 170 arranged between the top end of the first middle frame 100 and the first audio assembly 120; and/or a third circuit board 190 (e.g., an auxiliary circuit board 190), arranged between the bottom end of the first middle frame 100 and the second audio assembly 130.

Generally, as shown in FIG. 2 and FIG. 3, the sound output channels 141 are configured to communicate the external environment with sound cavities 151 of the audio assemblies, and sound generated by the sound output face of the first audio assembly enters the sound output channel 141 through the sound cavity 151 and is transmitted to the external environment through the sound output channel 141 to be heard by a user.

In a specific example, as shown in FIG. 2, an interval is reserved between the first audio assembly 120 and the top end of the first middle frame 100, and the interval is configured to install a second circuit board 170 (e.g., the circuit board); and an interval is reserved between the second audio assembly 130 and the bottom end of the first middle frame 100, and the interval is configured to install a third circuit board 190 (e.g., the auxiliary circuit board). By the overall arrangement, the structural space in the plane direction of the first middle frame 100 is fully utilized, and the space utilization rate of the first middle frame 100 is increased.

For example, the interval is reserved between the first audio assembly 120 and the top end of the first middle frame 100, and the interval is configured to install the circuit board 170; and an interval is reserved between the second audio assembly 130 and the bottom end of the first middle frame 100, and the interval is configured to install the auxiliary circuit board 190. By the overall arrangement, the structural space in the plane direction of the first middle frame 100 is fully utilized, and the space utilization rate of the first middle frame 100 is increased.

In another optional example, the second circuit board 170 (e.g., the circuit board) and the sound output channels 141 corresponding to the first audio assembly 120 are stacked in the thickness direction of the first middle frame 100; and the third circuit board 190 (e.g., the auxiliary circuit board) and the sound output channels 141 corresponding to the second audio assembly 130 are stacked in the thickness direction of the first middle frame 100.

The thickness direction of the first middle frame 100 is a direction roughly perpendicular to the first screen 300. By the arrangement positions of the second circuit board 170 (e.g., the circuit board) and the third circuit board 190 (e.g., the auxiliary circuit board), the space in the thickness direction of the first middle frame 100 is fully utilized, and the structural space of the first middle frame 100 is further improved.

For example, a circuit board 170 and the sound output channels 141 corresponding to the first audio assembly 120 are stacked in a thickness direction of the first middle frame 100; and an auxiliary circuit board 190 and the sound output channels 141 corresponding to the second audio assembly 130 are stacked in the thickness direction of the first middle frame 100.

The thickness direction of the first middle frame 100 is a direction roughly perpendicular to the first screen 300. By the arrangement positions of the circuit board 170 and the auxiliary circuit board 190, the space in the thickness direction fo the first middle frame 100 is fully utilized, and the structural space of the first middle frame 100 is further improved.

In another optional example, the first middle frame includes: a frame antenna 710; and
- a sound output hole of the first audio assembly or the second audio assembly is formed in the frame antenna 710.

In the example of the present disclosure, the sound output hole is formed in the frame antenna, or the frame antenna is formed in the position of the sound output hole, the arrangement space of the antenna is expanded, and the structural space of the first middle frame is fully utilized.

In another optional example, the frame antenna 710 is electrically connected with the second circuit board (e.g., the circuit board) or the third circuit board (e.g., the auxiliary circuit board) through a spring plate 720 or/and an elastic probe 720.

For example, the frame antenna 710 is electrically connected with the circuit board 170 or the auxiliary circuit board 190 through a spring plate 720 or/and an elastic probe 720.

The spring plate or elastic probe 720 has elasticity, by the elasticity of the feed line, connection between the frame antenna and the third circuit board (e.g., the auxiliary circuit board) can be always kept, the reliability of connection between the frame antenna and the third circuit is improved, and the stability of the frame antenna transmitting and receiving wireless signals is guaranteed.

For example, the elasticity of the feed line, connection between the frame antenna and the auxiliary circuit board 190 can be always kept, the reliability of connection between the frame antenna and the auxiliary circuit board 190 is improved, and the stability of the frame antenna transmitting and receiving wireless signals is guaranteed.

In another optional example, the terminal further includes:
- a first sealing structure 181, arranged between the first middle frame 100 and the first audio assembly 120; and/or
- a second sealing structure 182, arranged between the first middle frame 100 and the second audio assembly 130.

The first sealing structure 181 and the second sealing structure 182 at least have a dust control effect, and can intercept and filter sundries such as dust or cotton wool in the external environment to prevent the sundries from entering the sound output channels 141 via the sound output holes 1411, and risks that the sound output channels 141 and/or the audio assemblies are blocked are reduced.

In another optional example, the first sealing structure 181 includes: a first sealing piece and a first dust screen; the first sealing piece is arranged between the first middle frame and the first audio assembly, and seals a gap between the first middle frame and the first audio assembly; and the two opposite ends of the first dust screen are embedded in the first sealing piece, and the first dust screen is arranged in the sound output channel in a penetrating manner in the radial direction of the sound output channel corresponding to the first audio assembly; and/or the second sealing structure 182 includes: a second sealing piece and a second dust screen; the second sealing piece is arranged between the first middle frame and the second audio assembly, and seals a gap between the first middle frame and the second audio assembly; and the two opposite ends of the second dust screen are embedded in the second sealing piece, and the second dust screen is arranged in the sound output channel in a penetrating manner in the radial direction of the sound output channel corresponding to the second audio assembly.

Without limitation, the structure of the first sealing structure 181 and the structure of the second sealing structure 182 are the same.

The first sealing piece can at least carry out liquid sealing at the joint between the first audio assembly 120 and the first middle frame 100, the circumstances that after liquid or dust and the like of the external environment enters the sound output channel 141 from the sound output hole 1411, the liquid or dust and the like enters and flows out of the sound output channel 141 from the gap between the first audio assembly 120 and the first middle frame, and then enters other internal space of the terminal are limited, for example, the circumstance that the liquid or dust and the like enters the interval between the first rear shell 160 and the first middle frame 100 is prevented, and influences on devices in the terminal are reduced. The second sealing piece also has similar effects, and the description will not be repeated.

It will be appreciated that the first sealing piece can seal the gap between the first middle frame 100 and the first audio assembly 120; and seal can also be achieved at the position where the first dust screen is inserted. Similarly, the second sealing piece can seal the gap between the first middle frame 100 and the second audio assembly 130; and seal can also be achieved at the position where the second dust screen is inserted.

Without limitation, the sealing pieces have elasticity, the sealing pieces may be compressed by pressing force of the first middle frame 100 and the audio assemblies, and thus, the sealing effect of the sealing pieces is guaranteed.

The first sealing piece and the second sealing piece include but not limited to foam or silica gel.

Without limitation, the sealing pieces (the first sealing piece and/or the second sealing piece) form part of a channel wall of the sound output channel 141, namely, a part of the sound output channel 141 is formed by enclosing of the sealing pieces. The sealing pieces 141 may be sealing rings.

The dust screen can limit sundries such as dust or flying wool from entering the sound output channel 141 via a sound hole, the cleanliness of the sound output channel 141 is improved, and the sound making effect is guaranteed. The dust screens (namely the first dust screen and/or the second dust screen) are arranged in the rough radial direction of the sound output channel 141 to guarantee that at least part of the dust screens is located in the sound output channel 141 and guarantee the interception effect of the dust screens on impurities such as dust and cotton wool. Without limitation, the rough radial direction may be the thickness direction of the first middle frame.

In another optional example, the terminal further includes:
- a second camera assembly 250, arranged on the second middle frame; and
- a fourth circuit board 620, wherein at least part of the fourth circuit board is arranged between the third sound assembly 210 and the second camera assembly 250.

In some examples, as shown in FIG. 5, when the first camera 110 is a rear camera, the second camera 250 may be a front camera. On the contrary, when the first camera 110 is a front camera, the second camera 250 may be a rear camera.

Without limitation, the second camera 250 and the third audio assembly 210 are distributed in parallel in the width direction of the second middle frame 200. As shown in FIG. 5, the second camera 250 is located in an interval between the third audio assembly 210 and the side edge, far away from the rotating assembly, of the second middle frame 200.

Without limitation, part of the fourth circuit board 620 located between the second camera assembly 250 and the first audio assembly 120 may be used for bearing the radio-frequency circuit and the feed spring plate, wherein the radio-frequency circuit is connected with a frame antenna of the terminal through the feed spring plate, and feed signals into the frame antenna.

In another optional example, the terminal further includes:
- an earphone audio assembly 230, arranged on the second middle frame 200; and the third audio assembly 210 is located between the earphone audio assembly 230 and the second camera assembly 250.

As shown in FIG. 5, the earphone audio assembly 230 and the third audio assembly 210 are located between the rotating assembly and the second camera assembly 250, and the earphone audio assembly 230, the third audio assembly 210 and the second camera assembly 250 are distributed in parallel.

In practical application, an earphone may be placed on the upper left portion of the second middle frame in an inverted sound guiding mode, namely, the sound output face of the earphone faces away from the first screen, and a sound output hole of the earphone is located on the surface, facing away from the first screen, of the second middle frame.

In some examples, the terminal further includes:
- a second screen 500, with the back face covering the surface, facing away from the first screen 300, of the second middle frame 200, wherein the third audio assembly 210 and the fourth audio assembly 220 are located between the second screen and the second middle frame 200.

Without limitation, the second screen 500 is a hard screen.

In practical application, according to use frequency of the screens, the two screens of the terminal are generally divided into a main screen and an auxiliary screen, the screen with high use frequency serves as the main screen, and the screen with relatively low use frequency serves as the auxiliary screen; or the screen with large display area is defaulted as the main screen while the other screen of the terminal is defaulted as the auxiliary screen, and the display state of the auxiliary screen is controlled according to the display state of the main screen. In the example of the present disclosure, the second screen may serve as the auxiliary screen, and the first screen serves as the main screen.

In an example, when the terminal is in an unfolding posture, then the first screen is in an unfolding posture; and parts of the first screen in the unfolding posture are not overlapped and located in one plane, and the first screen may enter a full-screen display state.

Due to the fact that the first screen is in the full-screen display state, the display area of the terminal is large enough, in order to achieve the purpose of reducing power consumption, the second screen may be controlled to enter a non-display state according to the display state of the first screen when it determines that the first screen is in the full-screen display state, namely, a closing state is displayed, and then power consumption of the terminal on the second screen is reduced. Of course, if it detects that a user is in the orientation of the second screen, the second screen may also be maintained in the display state.

For example, when the terminal is in an unfolding posture and the first screen is in full-screen display, switching of display states of the first screen and/or the second screen may further be determined according to the application state of the terminal. If the application state of the terminal includes that the terminal receives voice communication, prompt is output on the first screen in the display state; the prompt is configured to prompt whether the first screen is folded to enter a state that the terminal is held with a hand for communication; and if feedback information of the prompt is detected, display of the first screen is closed, display of the second screen is started, a call answering interface displayed on the first screen is transferred to the second screen to be displayed. Voice communication includes: voice communication initiated by real-time communication application, and further includes: voice communication based on a circuit switching technology.

In one example, the terminal is in a folding posture, and then the first screen is in the folding posture; the first screen in the folding posture may be in a display closing state. If the application state of the terminal is the state that the terminal receives the voice communication, due to the fact that the second screen forms part of the outer surface of the terminal, in order to conveniently remind the user to receive the voice communication, the second screen is controlled to be in a display state, and the first screen is controlled to be kept in a display closing state.

In another optional example, the terminal further includes:

a fifth circuit board 260, wherein at least part of the fifth circuit board 260 is arranged between the earphone audio assembly 230 and the edge of the second middle frame 200.

In practical application, the edge of the second middle frame 200 may be at least one of the following parts: the top end of the second middle frame 200, and the left side end or the right side end of the second middle frame 200.

FIG. 5 exemplarily shows that part of the fifth circuit board 260 is arranged between the earphone audio assembly 230 and the left side end of the second middle frame 200, and the fifth circuit board 260 is partially arranged between the earphone audio assembly 230 and the top end of the second middle frame 200.

Without limitation, the fifth circuit board 260 may be used for a radio-frequency wire, connection of coaxial cables and the like.

The fifth circuit board 260 fully utilizes other spaces except for spaces for installation of the third audio assembly, the second camera assembly and the earphone audio assembly in the second middle frame, and the space utilization rate of the second middle frame is increased.

In another optional example, the terminal further includes:

a motor 240, arranged on the second middle frame 200, wherein the earphone audio assembly 230 is located between the motor 240 and the top end of the second middle frame 200.

Without limitation, as shown in FIG. 5, the motor 240 is located below the earphone audio assembly 230, and keeps away from the rotating assembly during installation. The motor 240 is used for achieving a vibrating effect, and is cooperatively used with an application program and/or system of the terminal, and an application program service state or a system running state is reminded. For example, during an incoming call, incoming call information is displayed on the second screen, meanwhile, the motor 240 is started, the terminal achieves a vibrating effect, and a reminding effect is enhanced.

In a specific example, the terminal is a mobile phone. The mobile phone includes a first middle frame 100 and a second middle frame 200, the first middle frame 100 and the second middle frame 200 are connected through a rotating shaft, as shown in FIG. 1, a first audio assembly 120, a second audio assembly 130 and a rear camera (namely a first camera assembly 110) are placed at the top end of the first middle frame 100, a certain width (for example: 4.4 mm) is reserved between each of the first audio assembly 120 and the second audio assembly 130, and the edge of the first middle frame 100 so as to store the second circuit board 170 (e.g., the circuit board), and the second circuit board 170 may be a PCB (printed circuit board), and is used for accommodating devices and antenna wires to fulfill antenna functions. Due to limitation of the thickness of the mobile terminal, the sound output channels 141 of the first audio assembly 120 and the second audio assembly 130 need to pass through the portion below the second circuit board 170, and devices are not placed in the portion below the second circuit board 170.

For example, the circuit board may be a PCB (printed circuit board). Due to limitation of the thickness of the mobile terminal, the sound output channels 141 of the first audio assembly 120 and the second audio assembly 130 need to pass through the portion below the circuit board 170, and devices are not placed in the portion below the circuit board 170.

As shown in FIG. 2, the portion between the first audio assembly 120 and the first middle frame 100 and the portion between the second audio assembly 130 and the first middle frame 100 need to be sealed by sealing structures (a first sealing structure 181 and a second sealing structure 182). In order to guarantee machinability of the sound output channels 141 of the first middle frame 100, the sound output channels 141 are not suitable to be too long (about 9 mm), on the premise of guaranteeing the performance of an antenna, the width of the second circuit board 170 (e.g., the circuit board) needs to be as small as possible, meanwhile, the sound output channel 141 of the first middle frame 100 needs to keep away from an antenna partition strip 101, and requirements of appearance are met. The rear camera is vertically placed at the upper left position of the first middle frame 100, in order to guarantee that the length of a flexible circuit board of the camera meets requirements, a connector, connected with the second circuit board 170 (e.g., the circuit board), of the flexible circuit board needs to be placed above the second circuit board 170 (e.g., the circuit board), and a certain width needs to be reserved between the rear camera and the first audio assembly 120 for installation of part of the first circuit board so as to guarantee that the radio-frequency wire and the coaxial cables can pass through the space with the certain width.

As shown in FIG. 3, intervals with certain width need to be reserved between the second audio assembly 130 and the bottom end and the left and right side ends of the first middle frame 100 and are used for installation of part of the third circuit board 190 (e.g., the auxiliary circuit board) and storage of devices, antenna wires and the like so as to fulfill the antenna function. Due to limitation on the thickness of the mobile terminal, the sound output channel 141 corresponding to the second audio assembly 130 located at the bottom end of the first middle frame 100 also needs to pass through the space below the third circuit board 190 (e.g., the auxiliary circuit board), and devices are not placed in the space below the third circuit board 190 (e.g., the auxiliary circuit board). In order to guarantee machinability of the sound output channels of the first middle frame 100, the channels are not suitable to be too long, on the premise of guaranteeing the performance of the antenna, the width of the portion, located at the bottom of the first middle frame 100, of the third circuit board 190 (e.g., the auxiliary circuit board) needs to be as small as possible, and meanwhile, the sound output channels 141 of the first middle frame 100 need to keep away from the antenna partition strip 101 to meet the requirements of appearance, as shown in FIG. 4.

As shown in FIG. 5, the third audio assembly 210 is placed above the second middle frame 200, the front camera (namely the second camera assembly 250) is placed at the upper right corner position of the second middle frame 200, a certain interval needs to be reserved between the third audio assembly 210 and the front camera, and is used for storing part of the fourth circuit board, so that an antenna feed spring plate and devices are stored and the requirements of the antenna wire are met. The earphone audio assembly 230 is placed in the upper left direction of the second middle frame 200 in an inverted sound guiding mode, a certain interval needs to be reserved between the upper portion of the earphone audio assembly 230 and the edge of the second middle frame 200 for installation of the fifth circuit board, and the circuit board is also used for storing the antenna feed spring plate and meeting the requirements of the antenna wires. The motor 240 is placed below the earphone audio assembly 230, due to limitation of space of the Z direction (the Z direction refers to the direction perpendicular to the largest surface of the first middle frame 100), the motor 240 needs to keep away from areas of devices such as a rotating shaft steel plate and the main screen (referring to the first screen 300). The positions of connectors of corresponding devices (such as cameras) and the positions of a connector for the main screen and the auxiliary screen are planned reasonably, and on the premise of keeping away from the key devices and the circuit boards, the sizes of sound cavities of the third audio assembly 210 and the fourth audio assembly 220 are maximized to meet an audio requirement. As shown in FIG. 6, the size of the sound cavity of the fourth audio assembly 220 at the bottom end of the second middle frame 200 is basically the same as the size of the sound cavity of the third audio assembly 210 at the top end of the second middle frame 200, and thus, a better audio effect may be achieved.

Figure 7:
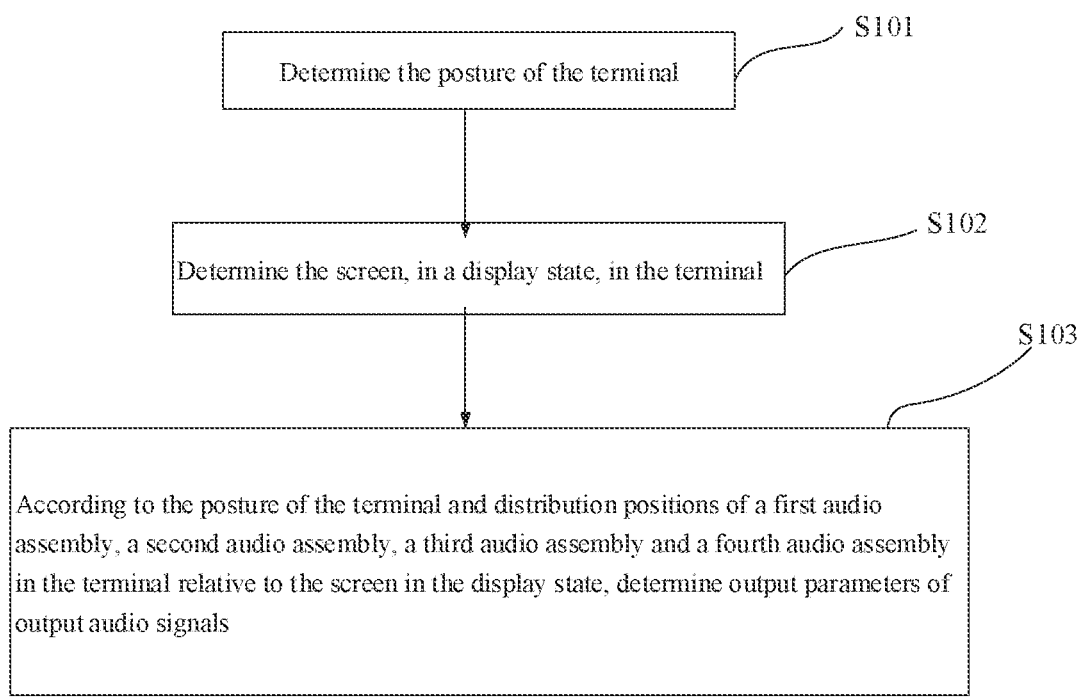
FIG. 7 is a flowchart illustrating a control method according to one or more examples of the present disclosure.

As shown in FIG. 7, an example of the present disclosure further provides a control method, applied to the terminal of any foregoing example, and at least including the following steps:

S101, the posture of the terminal is determined;

S102, the screen, in a display state, in the terminal is determined; and

S103, according to the posture of the terminal and distribution positions of the first audio assembly, the second audio assembly, the third audio assembly and the fourth audio assembly in the terminal relative to the screen in the display state, output parameters of output audio signals are determined.

In step S101, the postures of the terminal include: an unfolding posture and a folding posture. In the unfolding posture, an included angle which is 180 degrees roughly is formed between the first middle frame and the second middle frame, and the first screen is exposed. In the folding posture, an included angle which is 0 degree roughly is formed between the first middle frame and the second middle frame, and the first screen is hidden between the first middle frame and the second middle frame.

In step S102, the screen in the display state may be the first screen and/or the second screen. It will be appreciated that when the first screen and the second screen are both in a display state, according to the posture of the terminal and distribution positions of the first audio assembly, the second audio assembly, the third audio assembly and the fourth audio assembly in the terminal relative to the main screen, the output parameters of the output audio signals are determined.

In step S103, the distribution positions of the multiple audio assemblies relative to the screen in the display state may be determined according to the display direction of the screen in the display state.

According to the relationship between the display direction and the direction of long sides of the middle frames of the terminal, the display direction is generally divided into a vertical screen direction and a transverse screen direction, wherein the vertical screen direction refers to that the display direction is parallel to the direction of long sides of the first middle frame or the second middle frame, at the moment, the center line of the display area of the screen is roughly parallel to or superposed to the center line of the rotating assembly. The transverse screen direction refers to that the display direction is parallel to the direction of short sides of the first middle frame or the second middle frame, at the moment, the center line of the display area of the screen is roughly perpendicular to the center line of the rotating assembly.

In some examples, when the terminal is in an unfolding posture and the first screen is in a display state, if the display direction of the first screen is a vertical screen direction, the first audio assembly and the second audio assembly may be located on the left side of the center line of the display area of the first screen, and the third audio assembly and the fourth audio assembly may be located on the right side of the center line of the display area of the first screen. If the display direction of the first screen is a transverse screen direction, the first audio assembly and the third audio assembly may be located on the left side of the center line of the display area of the first screen, and the second audio assembly and the fourth audio assembly may be located on the right side of the center line of the display area of the first screen.

In another optional example, the output parameters include:

identifications of a target audio assembly outputting audio signals.

The identifications of the target audio assembly include but not limited to name or address information and the like of the audio assembly.

In some example, when the first screen is in a display state, four target audio assemblies outputting the audio signals may be arranged. When the second screen is in a display state, two target audio assemblies may meet good audio playing effect.

In another optional example, the output parameters further include:

identifications of a target audio assembly outputting left channel audio signals and/or identifications of a target audio assembly outputting right channel audio signals.

In another optional example, the step that according to the display state of the terminal and the distribution positions of the first audio assembly, the second audio assembly, the third audio assembly and the fourth audio assembly in the terminal relative to the screen in the display state, the output parameters of the output audio signals are determined includes:

the identifications of the target audio assembly outputting the audio signals in the current posture are determined from the first audio assembly, the second audio assembly, the third audio assembly and the fourth audio assembly; wherein the current posture includes: a folding posture or an unfolding posture.

In some examples, when in the unfolding posture, the first screen is in a display state, due to the fact that the first screen simultaneously covers the first middle frame and the second middle frame, the first audio assembly and the second audio assembly are mounted on the first middle frame, and the third audio assembly and the fourth audio assembly are mounted on the second middle frame. Therefore, the display area of the first screen simultaneously covers the four audio assemblies, and at the moment, the four audio assemblies may all serve as target audio assemblies.

In some examples, when in the folding posture, only the second screen may be in a display state, the second screen only covers the second middle frame, the third audio assembly and the fourth audio assembly are also mounted on the second middle frame, at the moment, only the third audio assembly and the fourth audio assembly are located in a coverage range of the second screen, and it may be determined that the third audio assembly and the fourth audio assembly are target audio assemblies. At the moment, the four audio assemblies may not need to serve as target audio assemblies, and power consumption is reduced.

It will be appreciated that when in the folding posture, in order to achieve a better audio playing effect, it may also be determined that the four audio assemblies are target audio assemblies.

In another optional example, the step that the identifications of the target audio assembly outputting the audio signals in the current posture are determined from the first audio assembly, the second audio assembly, the third audio assembly and the fourth audio assembly includes:
 if the current posture is a folding posture, the identifications of the target audio assembly outputting left channel audio signals are determined as identifications of the first audio assembly and/or identifications of the third audio assembly, and the identifications of the target audio assembly outputting right channel audio signals are identifications of the second audio assembly and/or identifications of the fourth audio assembly; or,
 the identifications of the target audio assembly outputting right channel audio signals are determined as identifications of the first audio assembly and/or identifications of the third audio assembly, and the identifications of the target audio assembly outputting left channel audio signals are identifications of the second audio assembly and/or identifications of the fourth audio assembly.

In practical application, when in a folding posture, the first screen is in a non-display state, at least one of the first audio assembly and the third audio assembly which are located at the top end of the terminal as well as at least one of the second audio assembly and the fourth audio assembly at the bottom end of the terminal may be selected as target audio assemblies to form stereo sound. The target audio assembly outputting the left channel audio signals and the target audio assembly outputting the right channel audio signals may be designated at will according to needs.

In another optional example, the step that the output parameters of the output audio signals are determined according to the display state of the terminal and the distribution positions of the first audio assembly, the second audio assembly, the third audio assembly and the fourth audio assembly in the terminal relative to the screen in the display state further includes:
 if the current posture is an unfolding posture, identifications of the target audio assembly outputting audio signals in the current display state are determined; wherein the current display state includes: a transverse screen state or a vertical screen state; and
 indication parameters of the target audio assembly are determined.

In practical application, when in a transverse screen state and a vertical screen state, the screen in a display state is different from the audio assembly aligned to the left hand of the user, by the mode of determining the target audio assemblies in the example of the present disclosure, the degree of matching between the audio signals output by the target audio assembly and the state of the user in different display states is increased, and user experiences are improved.

In another optional example, the step that the indication parameters of the target audio assembly are determined includes:
 when the multiple target audio assemblies are arranged, it is determined that the target audio assembly located on the left side of the center line of the screen in the display state outputs right channel audio signals according to the distribution positions of the target audio assemblies in the terminal; and/or
 the multiple target audio assemblies are arranged, it is determined that the target audio assembly located on the right side of the center line of the screen in the display state outputs left channel audio signals according to the distribution positions of the target audio assemblies in the terminal.

In some examples, the orientation of the display area in the display state is defaulted as the direction in which the user is located. When the first screen is in a vertical screen display state or a transverse screen display state, four target audio assemblies are arranged, the target audio assembly located on the right side of the center line of the display area of the first screen (also referring to the side of the left hand of a user) outputs left channel audio signals, the target audio assembly located on the left side of the center line of the display area of the first screen (also referring to the side of the right hand of the user) outputs right channel audio signals; wherein the target audio assemblies include at least one of the first audio assembly, the second audio assembly, the third audio assembly and the fourth audio assembly. For example, when the first screen is in a vertical screen display state, the first audio assembly and the second audio assembly which are located on the left side of the center line of the display area of the first screen output right channel audio signals; and the third audio assembly and the fourth audio assembly which are located on the right side of the center line of the display area of the first screen output left channel audio signals.

In some examples, when the second screen is in a display state, two target audio assemblies are arranged, one of the two target audio assemblies outputs left channel audio signals while the other target audio assembly outputs right channel audio signals.

An example of the present disclosure further provides a control device, including:
 a first determination module, configured to determine the posture of the terminal;
 a second determination module, configured to determine the screen, in a display state, in the terminal; and a third determination module, configured to determine output parameters of output audio signals according to the posture of the terminal and distribution positions of the first audio assembly, the second audio assembly, the third audio assembly and the fourth audio assembly in the terminal relative to the screen in the display state.

In another optional example, the output parameters include:
identifications of the target audio assembly outputting audio signals.

In another optional example, the output parameters further include:
identifications of the audio assembly outputting left channel audio signals and/or identifications of the target audio assembly outputting right channel audio signals.

In another optional example, the third determination module is further configured to:
determine identifications of the target audio assembly outputting audio signals in the current posture from the first audio assembly, the second audio assembly, the third audio assembly and the fourth audio assembly; wherein the current posture includes: the folding posture or the unfolding posture.

In another optional example, the third determination module is further configured to:
if the current posture is the folding posture, determine that the identifications of the target audio assembly outputting left channel audio signals are identifications of the first audio assembly and/or identifications of the third audio assembly, and the identifications of the target audio assembly outputting right channel audio signals are identifications of the second audio assembly and/or identifications of the fourth audio assembly; or,
determine that the identifications of the target audio assembly outputting right channel audio signals are identifications of the first audio assembly and/or identifications of the third audio assembly, and the identifications of the target audio assembly outputting left channel audio signals are identifications of the second audio assembly and/or identifications of the fourth audio assembly.

In another optional example, the third determination module is further configured to:
if the current posture is the unfolding posture, determine the identifications of the target audio assembly outputting audio signals in the current display state; wherein the current display state includes: a transverse screen state or a vertical screen state; and
determine indication parameters of the target audio assembly.

In another optional example, the third determination module is further configured to:
when the multiple target audio assemblies are arranged, determine that the target audio assembly located on the left side of the center line of the screen in a display state outputs right channel audio signals according to the distribution positions of the target audio assemblies in the terminal; and/or
when the multiple target audio assemblies are arranged, determine that the target audio assembly located on the right side of the center line of the screen in the display state outputs left channel audio signals according to the distribution positions of the target audio assemblies in the terminal.

An example of the present disclosure further provides equipment, including a processor, a memory and an executable program capable of being run via the processor, wherein the processor executes steps of the control method in any one of the foregoing examples when running the executable program.

An example of the present disclosure further provides a storage medium, the executable program is stored on the storage medium, and when the executable program is executed by the processor, the steps of the control method in any one of the foregoing examples are implemented.

Figure 8:
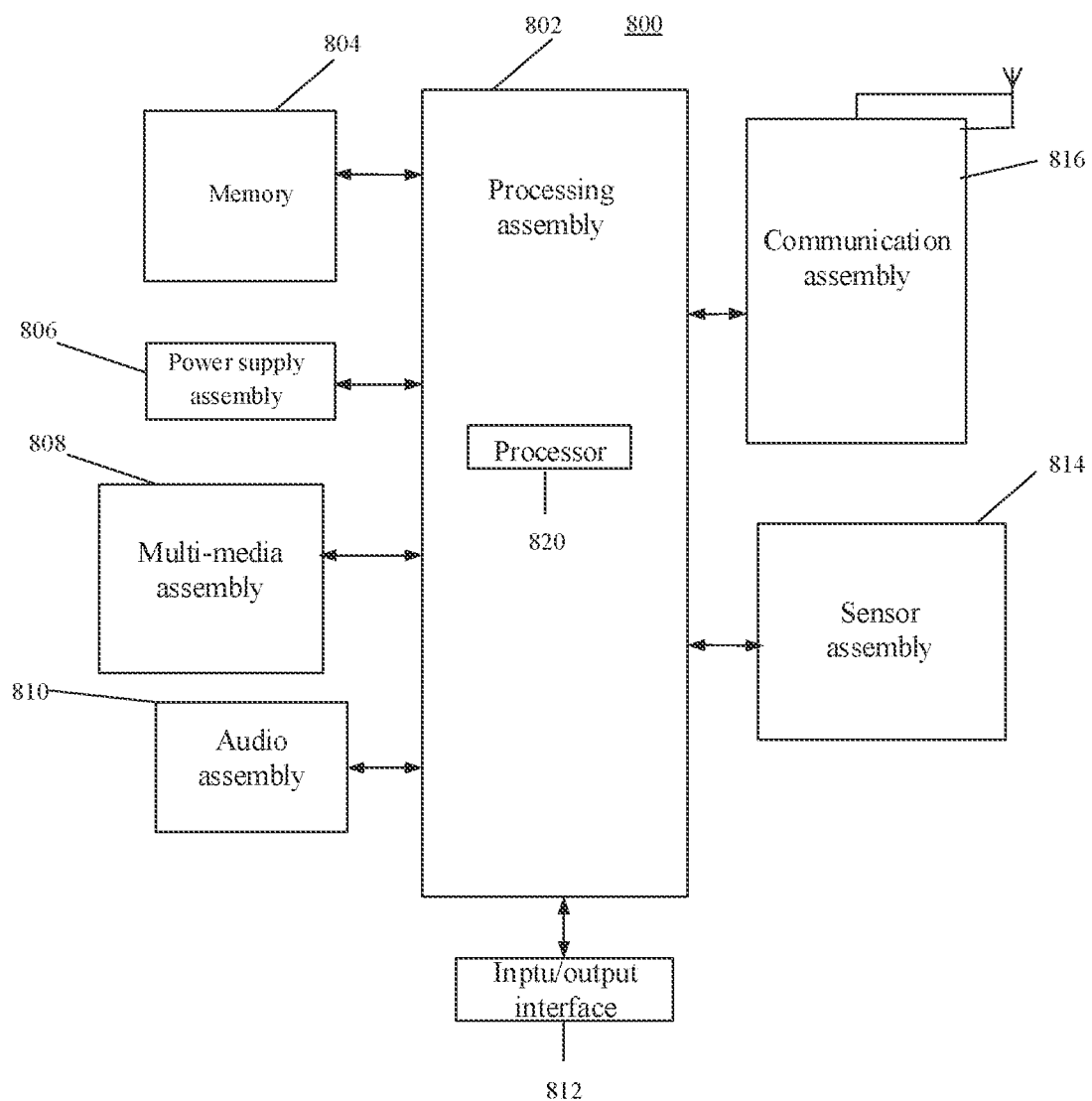
FIG. 8 is a block diagram of a composition structure of a control device for controlling the terminal according to one or more examples of the present disclosure.

FIG. 8 is a block diagram illustrating a control device 800 for controlling a terminal according to an exemplary example. For example, the device 800 may be a mobile telephone, a computer, a digital broadcasting terminal, message receiving and transmitting equipment, a game console, a tablet device, medical equipment, fitness equipment, a personal digital assistant and the like.

Referring to FIG. 3, the device 300 may include one or more following assemblies: a processing assembly 802, a memory 804, a power supply assembly 806, a multi-media assembly 808, an audio assembly 810, an interface 812 of input/output (I/O), a sensor assembly 814 and a communication assembly 816.

The processing assembly 802 usually controls integral operation of the device 800, such as operations associated with display, telephone call, data communication, camera operation and record operation. The processing assembly 802 may include one or more processors 820 to execute instructions so as to complete all or part of steps of the method. In addition, the processing assembly 802 may include one or more modules, and interaction between the processing assembly 802 and other assemblies is facilitated. For example, the processing assembly 802 may include the multi-media module, and interaction between the multi-media assembly 808 and the processing assembly 802 is facilitated.

The memory 804 is configured to store data in various types to support operation on the device 800. Examples of these data include instructions of any application program or method operated on the device 800, contact person data, telephone directory data, messages, pictures, videos and the like. The memory 804 may be implemented by volatile or nonvolatile storage equipment in any types or a combination of the volatile storage equipment and the nonvolatile storage equipment, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or a compact disk.

The power supply assembly 806 provides electric power for various assemblies of the device 800. The power supply assembly 806 may include a power supply management system, one or more power supplies and other assemblies associated with generation, management and electric power distribution of the device 800.

The multi-media assembly 808 includes a screen with an output interface between the device 800 and the user. In some examples, the screen may include a liquid crystal display (LCD) and a touch panel (TP). If the screen includes a tough panel, the screen may be implemented as a touch screen to receive input signals from the user. The touch panel includes one or more touch sensors to sense touching, sliding and gestures on the touch panel. The touch sensors may sense boundaries of touching or sliding actions, and further detect time of duration and pressure related to touching or sliding operation. In some examples, the multi-media assembly 808 includes a front camera and/or a rear camera. When the device 800 is in an operation mode, such as a shooting mode or video mode, the front camera and/or the rear camera may receive multi-media data of the outside. Each front camera or each rear camera may be a fixed optical lens system or has focal length and optical zooming capability.

The audio assembly 810 is configured to output and/or input audio signals. For example, the audio assembly 810 includes a microphone (MIC), when the device 800 is in an operation mode, such as a call mode, a record mode and a voice recognition mode, the microphone is configured to receive external audio signals. The received audio signals may be further stored in the memory 804 or transmitted via a communication assembly 816. In some examples, the audio assembly 810 further includes a loudspeaker which is used for outputting the audio signals.

An I/O interface 812 provides an interface between the processing assembly 802 and a peripheral interface module, the peripheral interface module may be a keyboard, a click wheel, buttons and the like. These buttons may include but not limited to a homepage button, a volume button, a starting button and a locking button.

The sensor assembly 814 includes one or more sensors, and is used for providing state evaluation of various aspects, for example, the sensor assembly 814 may detect a switch-on/switch-off state of the device 800 and relative positioning of assemblies, for example, the assemblies are a display and a keypad of the device 800, and the sensor assembly 814 may further detect position change of the device 800 or one assembly of the device 800, existence or inexistence of contact between the user and the device 800 and orientation or acceleration/deceleration of the device 800 and temperature change of the device 800. The sensor assembly 814 may include a proximity sensor, and is configured to detect existence of a nearby object when any physical contact does not exist. The sensor assembly 814 may further include an optical sensor such as a CMOS or CCD image sensor which is used in imaging application. In some examples, the sensor assembly 814 may further include an acceleration sensor, a gyroscope sensor, a magnetic sensor, a pressure sensor or a temperature sensor.

The communication assembly 816 is configured to facilitate wired or wireless communication between the device 800 and other equipment. The device 800 may be connected into a wireless network based on a communication standard, such as WiFi, 2G or 3G, or a combination of WiFi, 2G or 3G. In an example, the communication assembly 816 receives broadcast signals or broadcast related information from an external broadcast management system via a broadcast channel. In an example, the communication assembly 816 further includes a near field communication (NFC) module to promote short-range communication. For example, on the NFC module, short-range communication may be implemented based on a radio frequency identification (RFID) technology, an infrared data association (IrDA) technology, an ultra wide band technology, a Bluetooth (BT) technology and other technologies.

In an example, the device 800 may be implemented by one or more application specific integrated circuits (ASIC), a digital signal processor (DSP), a digital signal processing device (DSPD), a programmable logic device (PLD), a field programmable gate array (FPGA), a controller, a microcontroller, a microprocessor or other electronic elements, and is used for executing the method.

In an example, a non-temporary computer readable storage medium including instructions is further provided, such as a memory 804 including instructions, and the instructions may be executed by the processor 820 of the device 800 to complete the method. For example, the non-temporary computer readable storage medium may be a ROM, a random access memory (RAM), a CD-ROM, a magnetic tape, a floppy disk, optical data storage equipment and the like.

The technical solution provided by the present disclosure may include the following beneficial effects:

According to the examples in the present disclosure, the first audio assembly and the second audio assembly are distributed at the two opposite ends of the first middle frame respectively, the third audio assembly and the fourth audio assembly are distributed at the two opposite ends of the second middle frame respectively, and the audio assemblies located at the two opposite ends can form sound surrounding and generate stereo sound, so that the audio output effect is improved. In practical application, a target audio assembly for outputting audio signals may be selected from the multiple audio assemblies by utilizing the multiple audio assemblies according to the posture of the terminal, and a target audio assembly may also be determined from the multiple audio assemblies to output left channel audio signals and/or right channel audio signals, so that the purpose of flexibly determining the output parameters of the output audio signals is achieved; and application scenes are enriched, and audio output quality and user auditory experience are further improved.

The methods disclosed in several method examples provided by the present disclosure may be arbitrarily combined without conflict to obtain new method examples.

The features disclosed in several product examples provided by the present disclosure may be arbitrarily combined without conflict to obtain a new product example.

The features disclosed in several method or equipment examples provided by the present disclosure may be arbitrarily combined without conflict to obtain a new method or equipment example.

Other examples of the present disclosure will be readily apparent to those skilled in the art from consideration of the specification and practice of the invention disclosed herein. The present disclosure is intended to cover any variations, uses, or adaptations of the present disclosure following the general principles of the present disclosure and including common general knowledge or customary technical means in the technical field not disclosed by the present disclosure. The specification and examples are considered as exemplary only, and the true scope and spirit of the present disclosure are indicated by the claims.

It should be understood that the present disclosure is not limited to the precise construction that has been described above and shown in the accompanying drawings, and that various modifications and changes may be made without departing from its scope. The scope of the present disclosure is limited only by the appended claims.

What is claimed is:

1. A terminal, comprising:
a first middle frame;
a second middle frame;
a rotating assembly, located between the first middle frame and the second middle frame, and connected with the first middle frame and the second middle frame;
a first screen, comprising a back surface covering the first middle frame, the second middle frame and the rotating assembly, wherein the first screen is a folding screen;
a first audio assembly, disposed on top of the first middle frame, and connected to a top end of the first middle frame through a sound output channel to output sound;

a second audio assembly, disposed on bottom of the first middle frame, and connected to a bottom end of the first middle frame through a sound output channel to output sound;

a third audio assembly, disposed on top of the second middle frame, and connected to a top end of the second middle frame through a sound output channel to output sound; and a fourth audio assembly, disposed on bottom of the second middle frame, and connected to a bottom end of the second middle frame through a sound output channel to output sound;

a circuit board, disposed between the top end of the first middle frame and the first audio assembly; or an auxiliary circuit board, disposed between the bottom end of the first middle frame and the second audio assembly;

the circuit board and the sound output channel corresponding to the first audio assembly are stacked in a thickness direction of the first middle frame; and the auxiliary circuit board and the sound output channel corresponding to the second audio assembly are stacked in the thickness direction of the first middle frame.

2. The terminal according to claim 1, wherein the terminal further comprises:
a first camera assembly, disposed on the first middle frame; and
a first circuit board, at least part of the first circuit board being arranged between the first audio assembly and the first camera assembly.

3. The terminal according to claim 1, wherein the first middle frame comprises a frame antenna; and
the frame antenna is provided with a sound output hole of the first audio assembly or a sound output hole of the second audio assembly.

4. The terminal according to claim 3, wherein the frame antenna is electrically connected with the circuit board or the auxiliary circuit board through a spring plate or an elastic probe.

5. The terminal according to claim 1, wherein the terminal further comprises:
a first sealing structure, disposed between the first middle frame and the first audio assembly; or
a second sealing structure, disposed between the first middle frame and the second audio assembly.

6. The terminal according to claim 5, wherein
the first sealing structure comprises: a first sealing piece and a first dust screen; the first sealing piece is arranged between the first middle frame and the first audio assembly, and seals a gap between the first middle frame and the first audio assembly; two opposite ends of the first dust screen are embedded in the first sealing piece, and the first dust screen is arranged in the sound output channel in a penetrating manner in a radial direction of the sound output channel corresponding to the first audio assembly; or
the second sealing structure comprises: a second sealing piece and a second dust screen; the second sealing piece is arranged between the first middle frame and the second audio assembly, and seals a gap between the first middle frame and the second audio assembly; two opposite ends of the second dust screen are embedded in the second sealing piece, and the second dust screen is arranged in the sound output channel in a penetrating manner in a radial direction of the sound output channel corresponding to the second audio assembly.

7. The terminal according to claim 1, wherein the terminal further comprises:
a second camera assembly, disposed on the second middle frame; and
a second circuit board, at least part of the second circuit board being arranged between the third audio assembly and the second camera assembly.

8. The terminal according to claim 7, wherein the terminal further comprises:
an earphone audio assembly, disposed on the second middle frame, wherein the third audio assembly is located between the earphone audio assembly and the second camera assembly.

9. The terminal according to claim 8, wherein the terminal further comprises:
a third circuit board, at least part of the third circuit board being arranged between the earphone audio assembly and the edge of the second middle frame.

10. The terminal according to claim 8, wherein the terminal further comprises:
a motor, disposed on the second middle frame, wherein the earphone audio assembly is located between the motor and the top end of the second middle frame.

11. The terminal according to claim 1, wherein the terminal further comprises:
a second screen, covering the surface, facing away from the first screen, of the second middle frame, wherein the third audio assembly and the fourth audio assembly are located between the second screen and the second middle frame.

12. A control method, applied to a terminal, comprising:
determining a posture of the terminal, wherein the terminal comprises:
a first middle frame;
a second middle frame;
a rotating assembly, located between the first middle frame and the second middle frame, and connected with the first middle frame and the second middle frame;
a first screen, comprising a back surface covering the first middle frame, the second middle frame and the rotating assembly, wherein the first screen is a folding screen;
a first audio assembly, disposed on top of the first middle frame, and connected to a top end of the first middle frame through a sound output channel to output sound;
a second audio assembly, disposed on bottom of the first middle frame, and connected to a bottom end of the first middle frame through a sound output channel to output sound;
a third audio assembly, disposed on top of the second middle frame, and connected to a top end of the second middle frame through a sound output channel to output sound; and
a fourth audio assembly, disposed on bottom of the second middle frame, and connected to a bottom end of the second middle frame through a sound output channel to output sound;
a second circuit board, disposed between the top end of the first middle frame and the first audio assembly; or
an auxiliary circuit board, disposed between the bottom end of the first middle frame and the second audio assembly;
the circuit board and the sound output channel corresponding to the first audio assembly are stacked in a thickness direction of the first middle frame; and the auxiliary circuit board and the sound output channel corresponding to the second audio assembly are stacked in the thickness direction of the first middle frame;

determining a screen in the terminal that is in a display state; and according to the posture of the terminal and distribution positions of the first audio assembly, the second audio assembly, the third audio assembly and the fourth audio assembly in the terminal relative to the screen in the display state, determining output parameters of output audio signals.

13. The control method according to claim 12, wherein the output parameters comprise:

identifications of a target audio assembly outputting audio signals.

14. The control method according to claim 12, wherein according to the display state of the terminal and the distribution positions of the first audio assembly, the second audio assembly, the third audio assembly and the fourth audio assembly in the terminal relative to the screen in the display state, determining the output parameters of the output audio signals further comprises:

determining identifications of the target audio assembly outputting audio signals in current posture from the first audio assembly, the second audio assembly, the third audio assembly and the fourth audio assembly, wherein the current posture comprises: a folding posture or an unfolding posture.

15. The control method according to claim 14, wherein determining the identifications of the target audio assembly outputting audio signals in the current posture from the first audio assembly, the second audio assembly, the third audio assembly and the fourth audio assembly further comprises:

in response to the current posture being a folding posture, determining that the identifications of the target audio assembly outputting left channel audio signals are identifications of the first audio assembly and/or identifications of the third audio assembly, and the identifications of the target audio assembly outputting right channel audio signals are identifications of the second audio assembly or identifications of the fourth audio assembly; or determining that the identifications of the target audio assembly outputting right channel audio signals are identifications of the first audio assembly or identifications of the third audio assembly, and the identifications of the target audio assembly outputting left channel audio signals are identifications of the second audio assembly or identifications of the fourth audio assembly.

16. The control method according to claim 14, wherein according to the display state of the terminal and the distribution positions of the first audio assembly, the second audio assembly, the third audio assembly and the fourth audio assembly in the terminal relative to the screen in the display state, determining output parameters of output audio signals further comprises:

in response to the current posture being an unfolding posture, determining identifications of the target audio assembly outputting audio signals in the current display state, wherein the current display state comprises: a transverse screen state or a vertical screen state; and determining indication parameters of the target audio assembly.

17. The control method according to claim 16, wherein determining the indication parameters of the target audio assembly further comprises:

when multiple target audio assemblies exist, determining that the target audio assembly located on the left side of the center line of a screen in a display state outputs right channel audio signals according to the distribution positions of the target audio assemblies in the terminal; or when multiple target audio assemblies exist, determining that the target audio assembly located on the right side of the center line of the screen in the display state outputs left channel audio signals according to the distribution positions of the target audio assemblies in the terminal.

18. A equipment, comprising a processor, a memory and an executable program stored on the memory and capable of being run via the processor, wherein when the processor runs the executable program, following steps of a control method applied to a terminal are executed:

determining the posture of the terminal, wherein the terminal comprises:
a first middle frame;
a second middle frame;
a rotating assembly, located between the first middle frame and the second middle frame, and connected with the first middle frame and the second middle frame;
a first screen, comprising a back surface covering the first middle frame, the second middle frame and the rotating assembly, wherein the first screen is a folding screen;
a first audio assembly, disposed on top of the first middle frame, and connected to a top end of the first middle frame through a sound output channel to output sound;
a second audio assembly, disposed on bottom of the first middle frame, and connected to a bottom end of the first middle frame through a sound output channel to output sound;
a third audio assembly, disposed on top of the second middle frame, and connected to a top end of the second middle frame through a sound output channel to output sound; and
a fourth audio assembly, disposed on bottom of the second middle frame, and connected to a bottom end of the second middle frame through a sound output channel to output sound;
a circuit board, disposed between the top end of the first middle frame and the first audio assembly; or
an auxiliary circuit board, disposed between the bottom end of the first middle frame and the second audio assembly;
the circuit board and the sound output channel corresponding to the first audio assembly are stacked in a thickness direction of the first middle frame; and
the auxiliary circuit board and the sound output channel corresponding to the second audio assembly are stacked in the thickness direction of the first middle frame;

determining a screen in the terminal that is in a display state; and according to the posture of the terminal and distribution positions of the first audio assembly, the second audio assembly, the third audio assembly and the fourth audio assembly in the terminal relative to the screen in the display state, determining output parameters of output audio signals.

* * * * *